UNITED STATES PATENT OFFICE.

WALTER O. SNELLING, OF ALLENTOWN, PENNSYLVANIA, ASSIGNOR TO TROJAN POWDER COMPANY, OF ALLENTOWN, PENNSYLVANIA, A CORPORATION OF NEW YORK.

FERTILIZER.

1,410,037.      Specification of Letters Patent.     Patented Mar. 21, 1922.

No Drawing.     Application filed April 18, 1919. Serial No. 290,973.

*To all whom it may concern:*

Be it known that I, WALTER O. SNELLING, a citizen of the United States, and resident of Allentown, Lehigh County, Pennsylvania, have invented certain Improvements in Fertilizers, of which the following is a specification.

My invention relates to fertilizers, more particularly to nitrate fertilizers, the general object being to furnish to the soil nitrates having characteristics not possessed by the nitrates commonly used for fertilizing purposes.

The nitrates heretofore used for fertilizing purposes, such, for example, as sodium nitrate and potassium nitrate, are soluble in water, as are all inorganic nitrates, and their use in the soil involves loss in the "run off," considerable portions being carried away by ground water and by rains before becoming available for furnishing food for the plants. So far as I am aware, it has not heretofore been proposed to furnish nitrates to the soil in a form which, while rendering them insoluble, leaves them free to be acted upon by the humic acids in the soil and by the acid in the rootlets of the plants, and thereby to yield to the plants the ingredients useful as plant food.

I have discovered that the nitration of organic bodies, such, for example, as the carbohydrates, produces nitrates which are water insoluble, but which in the presence of the soil break up, with the production of bodies which are highly advantageous to the plant growth. When employed as a fertilizer or ingredient of a fertilizer, these nitrates being insoluble in water, are not immediately dissolved and carried off in large measure by rains or ground water, but are very slowly decomposed by the humic acids produced by the rootlets of the plant, thus giving the fertilizing properties when required, and at the exact point required. The fertilizer may be added to the soil several weeks before the seeds are planted, if this is necessary, and even under these circumstances, a large part of the fertilizer will remain in insoluble form, and its fertilizing value will thus be retained in spite of rains and the passage of ground water through the soil. As the rootlets of the plants come in contact with the fertilizer, however, the acid in the root tips and the root hairs, has the ability to decompose the organic nitrate and evolve the oxides of nitrogen. The remainder of the fertilizing material, which does not come in contact with the plant rootlets, decomposes only with extreme slowness, and for a period of months undergoes slow decomposition with the evolution of fertilizing ingredients as described. Furthermore, in decomposing, the organic nitrate yields not only the components of the nitric acid radical, but other fertilizing agents as well. For example, nitrated starch used in the manner described, will yield in addition to the components of the nitric acid radical, the components of the starch radical, these being very excellent fertilizing agents in a form available for plant food.

While I have mentioned nitrated starch as an illustration of an organic nitrate having the characteristics mentioned, other nitrated carbohydrates may be employed, as for example nitrolignose, nitro-cellulose, and other nitric acid esters of carbohydrates; nor do I wish to confine myself in the broadest aspect of my invention to nitrated carbohydrates, as nitrates may be produced by the action of nitric acid on other organic bodies, which nitrates would be water insoluble and yet subject to decomposition by the humic acids in the soil.

In treating the carbohydrates to produce the nitrated bodies for my purpose, known methods of nitration may be employed, and I do not wish to limit myself to any particular degree of nitration. Ordinarily the nitrate will be employed as but one of a number of ingredients going to make up a complete commercial fertilizer containing in addition, for example, phosphates and potash, as is the practice in fertilizer manufacture.

Another feature of my invention involves the control or predetermination of the period within which the nitrate may become available for plant food. If the conditions of use make quick fertilizing action desirable, an agent may be mixed with the nitrate to accelerate the decomposition. Nitrated starch, although in itself water insoluble, can be rendered completely soluble in water by the addition of ammonium nitrate, and as will be understood the degree of solubility and period of decomposition can be regulated according to the proportion of the accelerating agent employed. For very slow action, the nitrated starch will be used without the catalyzing agent; for relatively quick action, such that the fertilizing agent will be available for plant food in say from four to six weeks from the time the fertilizer is placed in the soil, enough of a saturated solution of ammonium nitrate should be employed to moisten all of the nitro-starch particles; for slower action, a weaker ammonium nitrate solution may be employed, a solution of 15 to 20% saturation, for example, causing the nitrated body to be relatively slow in decomposition. Of the mixture of nitro-starch and ammonium nitrate, from 5 to 20% may be ammonium nitrate. In specifying ammonium nitrate as an accelerating agent, I do not wish to be limited to that, as other agents are available, for example, sodium nitrate and alkalies, such for example, as lime.

Not only can I accelerate the decomposition of an organic nitrate, as explained, but I can also render the fertilizing action slower, by the addition to the nitrated body of a neutral body, such for example, as limestone (calcium carbonate), which will have no chemical action upon the nitrate, but which will delay the action of the humic acids upon the nitrate. After the neutralizing effect of the calcium carbonate upon the acids has been exhausted, said acids will be free to attack the organic nitrate, which will then become available for furnishing plant food.

It will be seen that by the treatment hereinabove described, a series of nitrate fertilizers can be prepared ranging from those in which the fertilizing effect can be very quick by reason of the reduction of the insoluble nitrated body, to water soluble nitrogen containing form, in advance of placing it in the soil, to those in which the fertilizing action can be made very slow not only by reason of the water insoluble character of the nitrated body itself, but by the addition thereto of an agent for delaying the action of the humic acids in the soil.

I claim:

1. A fertilizer comprising a nitrated carbohydrate and a catalyzer.

2. A fertilizer comprising a nitrated carbohydrate and a body having the chemical effect of changing said nitrated carbohydrate to water-soluble form.

3. A fertilizer comprising a nitrated carbohydrate and an agent for accelerating decomposition of said nitrated carbohydrate in the soil with evolution of ingredients available for plant food.

4. A fertilizer comprising a nitrated carbohydrate and ammonium nitrate.

5. A fertilizer comprising nitrated starch and ammonium nitrate.

6. In the method of manufacturing fertilizing nitrates the step which consists in changing water-insoluble nitrated carbohydrate to a water-soluble nitrogen containing product by the addition thereof of ammonium nitrate.

7. In the method of manufacturing fertilizing nitrates the step which consists in changing water-insoluble nitrated carbohydrate to a water-soluble nitrogen containing product by the addition thereto of a catalyzer.

8. The method of treating the soil to fertilize the same, which consists in the changing therein of a water-insoluble nitrated carbohydrate into water-soluble fertilizing ingredients.

9. The process of fertilizing soils which consists in supplying thereto a nitrated carbohydrate insoluble in water but susceptible of disintegration into components useful for plant food by the action of agents in the soil.

10. The process of fertilizing soils which consists in supplying thereto a nitrated carbohydrate insoluble in water, and decomposing said body into water soluble components by the action of humic acids in the soil.

11. The process of fertilizing soils, which includes the step of supplying to the soil a nitrated carbohydrate.

12. The process of fertilizing soils which includes the step of supplying to the soil nitro-starch.

WALTER O. SNELLING.